(12) United States Patent
Wantland et al.

(10) Patent No.: US 12,434,885 B2
(45) Date of Patent: Oct. 7, 2025

(54) PITCHER ASSEMBLY FOR REFRIGERATOR APPLIANCE

(71) Applicant: Haier US Appliance Solutions, Inc., Wilmington, DE (US)

(72) Inventors: Louis A. Wantland, Louisville, KY (US); Bradley Nicholas Gilkey, Louisville, KY (US); Jeffrey Michael Colyer, Louisville, KY (US); Lokesha Kodigenahalli Chinnappa Reddy, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 276 days.

(21) Appl. No.: 18/312,683

(22) Filed: May 5, 2023

(65) Prior Publication Data

US 2024/0367860 A1    Nov. 7, 2024

(51) Int. Cl.
| | |
|---|---|
| *B65D 25/42* | (2006.01) |
| *A47G 19/12* | (2006.01) |
| *B65D 25/02* | (2006.01) |
| *B65D 25/28* | (2006.01) |
| *B65D 43/02* | (2006.01) |

(Continued)

(52) U.S. Cl.
CPC ............ *B65D 25/42* (2013.01); *A47G 19/12* (2013.01); *B65D 25/02* (2013.01); *B65D 25/2832* (2013.01); *B65D 43/022* (2013.01); *B65D 53/02* (2013.01); *B65D 65/44* (2013.01); *B67D 3/0051* (2013.01); *B67D 3/0061* (2013.01); *B65D 2543/00194* (2013.01); *B65D 2543/00509* (2013.01); *B65D 2543/00564* (2013.01); *C02F 2307/04* (2013.01)

(58) Field of Classification Search
CPC .... B65D 25/42; B65D 25/02; B65D 25/2832; B65D 43/022; B65D 53/02; B65D 65/44; B65D 2543/00194; B65D 2543/00509; B65D 2543/00564; B67D 3/0051; B67D 3/0061; A47G 19/12; C02F 2307/04
See application file for complete search history.

(56) References Cited

U.S. PATENT DOCUMENTS 5,265,767 A * 11/1993 Gustafson .............. A47G 19/12
                                                        222/545
5,560,393 A    10/1996 Clack
(Continued)

FOREIGN PATENT DOCUMENTS

| CA | 2370912 A1 * | 8/2003 | ............ F25D 23/02 |
|---|---|---|---|
| CN | 205748504 U * | 11/2016 | ............... G01F 1/52 |

(Continued)

*Primary Examiner* — Frederick C Nicolas
(74) *Attorney, Agent, or Firm* — Dority & Manning, P.A.

(57) ABSTRACT

A pitcher assembly includes a pitcher including a wall connected to a bottom defining a picture volume. The wall defines an opening at the top edge of the pitcher and a spout is formed at the top edge of the pitcher. A lid is removably fitted to the opening, the lid having a vertical wall extending from the skirt at the spout, and a second wall extending into the spout. The first and second walls cooperate with the spout and the skirt to at least partially block liquid from unintentionally splashing out of the pitcher volume. The lid may also include an energy-absorbing material disposed between a vertically displaceable float body and the lid.

20 Claims, 7 Drawing Sheets

(51) Int. Cl.
  *B65D 53/02*  (2006.01)
  *B65D 81/02*  (2006.01)
  *B67D 3/00*  (2006.01)

(56) References Cited

U.S. PATENT DOCUMENTS

| | | | | |
|---|---|---|---|---|
| 6,224,751 | B1* | 5/2001 | Hofmann | C02F 1/003 |
| | | | | 210/85 |
| 6,231,226 | B1* | 5/2001 | Neidigh | A47J 43/1081 |
| | | | | 366/256 |
| 6,394,322 | B1* | 5/2002 | Sekiya | C23C 18/28 |
| | | | | 222/572 |
| 6,755,120 | B1* | 6/2004 | Lin | A47G 19/14 |
| | | | | 99/275 |
| 7,222,759 | B2* | 5/2007 | Bunn | A47G 19/14 |
| | | | | 222/475.1 |
| 9,090,483 | B2* | 7/2015 | Rajan | B01D 27/101 |
| 10,118,113 | B2 | 11/2018 | Shotey et al. | |
| 10,889,484 | B2 | 1/2021 | Subramanya et al. | |
| 11,619,439 | B2* | 4/2023 | Kwon | F25D 23/028 |
| | | | | 62/4 |
| 11,780,722 | B1* | 10/2023 | Wantland | B67D 1/0014 |
| | | | | 141/83 |
| 2003/0034283 | A1* | 2/2003 | Tsataros | C02F 1/003 |
| | | | | 210/85 |
| 2003/0196944 | A1* | 10/2003 | Tanner | C02F 1/003 |
| | | | | 210/201 |
| 2015/0197417 | A1* | 7/2015 | Stagg | B67D 1/0005 |
| | | | | 141/95 |
| 2015/0284260 | A1 | 10/2015 | Huda et al. | |
| 2020/0367674 | A1* | 11/2020 | Johnson | A47G 19/12 |
| 2024/0300802 | A1* | 9/2024 | Wantland | B67D 3/0087 |
| 2024/0336472 | A1* | 10/2024 | Reddy | B67D 3/0061 |

FOREIGN PATENT DOCUMENTS

| | | | | |
|---|---|---|---|---|
| CN | 218884445 U | * | 4/2023 | F25D 23/02 |
| CN | 219199692 U | * | 6/2023 | F25D 23/02 |

* cited by examiner

PITCHER ASSEMBLY FOR REFRIGERATOR APPLIANCE

FIELD OF THE INVENTION

The present disclosure relates generally to refrigerator appliances with door-mounted pitchers, for example water pitchers.

BACKGROUND OF THE INVENTION

Many refrigerator appliances include pitchers to facilitate dispensing of beverages, for example chilled drinking water. In some cases, the pitcher is mounted to an inside surface of one of the refrigerator doors to provide easy access to the pitcher. Some refrigerator appliances provide a retaining cavity on a door to receive and retain a pitcher, with some retaining cavities including an autofill feature to maintain a prescribed level of water in the pitcher without user intervention. With door-mounted pitchers, the contents of the pitcher are subject to frequent movement as the refrigerator appliance door is opened and closed. As the door is rotated opened and closed, door-mounted pitchers also rotate with the door. The motion of the pitcher induces a wave to form within the water in the pitcher.

In some cases, the wave formed in the pitcher causes the water to splash out of the pouring spout of the pitcher unintentionally, often leading to spills and consumer dissatisfaction. In other cases, particularly with autofill pitchers having a float mechanism, the float moves rapidly with the wave and, at times, contacts the pitcher lid making an audible sound, also leading to consumer dissatisfaction.

Accordingly, a pitcher addressing these known issues may be desirable.

BRIEF DESCRIPTION OF THE INVENTION

Aspects and advantages of the invention will be set forth in part in the following description, may be apparent from the description, or may be learned through practice of the invention.

In one exemplary aspect, a pitcher assembly is provided, the pitcher assembly defining vertical, lateral, and transverse directions, the pitcher assembly comprising a pitcher including a pitcher wall connected to a pitcher bottom to define a pitcher volume. The pitcher wall defines an opening at a top edge of the pitcher and a spout defined be a first spout wall, a second spout wall, and an incline wall. The pitcher assembly also includes a lid comprising a top wall having a bottom surface, a skirt extending from the bottom surface, a first wall disposed vertically below the skirt at the spout, and a second wall extending from the first wall into the spout. In the pitcher assembly, a flow path is defined by the first wall, the second wall, and the spout.

In another exemplary aspect, a pitcher defining vertical, lateral, an transverse directions is provided. The pitcher assembly comprises a pitcher including a pitcher wall connected to a pitcher bottom defining a volume, the pitcher wall defining an opening at a top edge of the pitcher. The pitcher assembly further comprises a lid removably fitted to the opening of the pitcher, the lid comprising a float body constrained for displacement in the vertical direction between a first position where a first end of the float body is proximate to an inner surface of the lid and a second position. The pitcher assembly includes an energy-absorbing material positioned vertically between the first end of the float body and the inner surface of the lid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
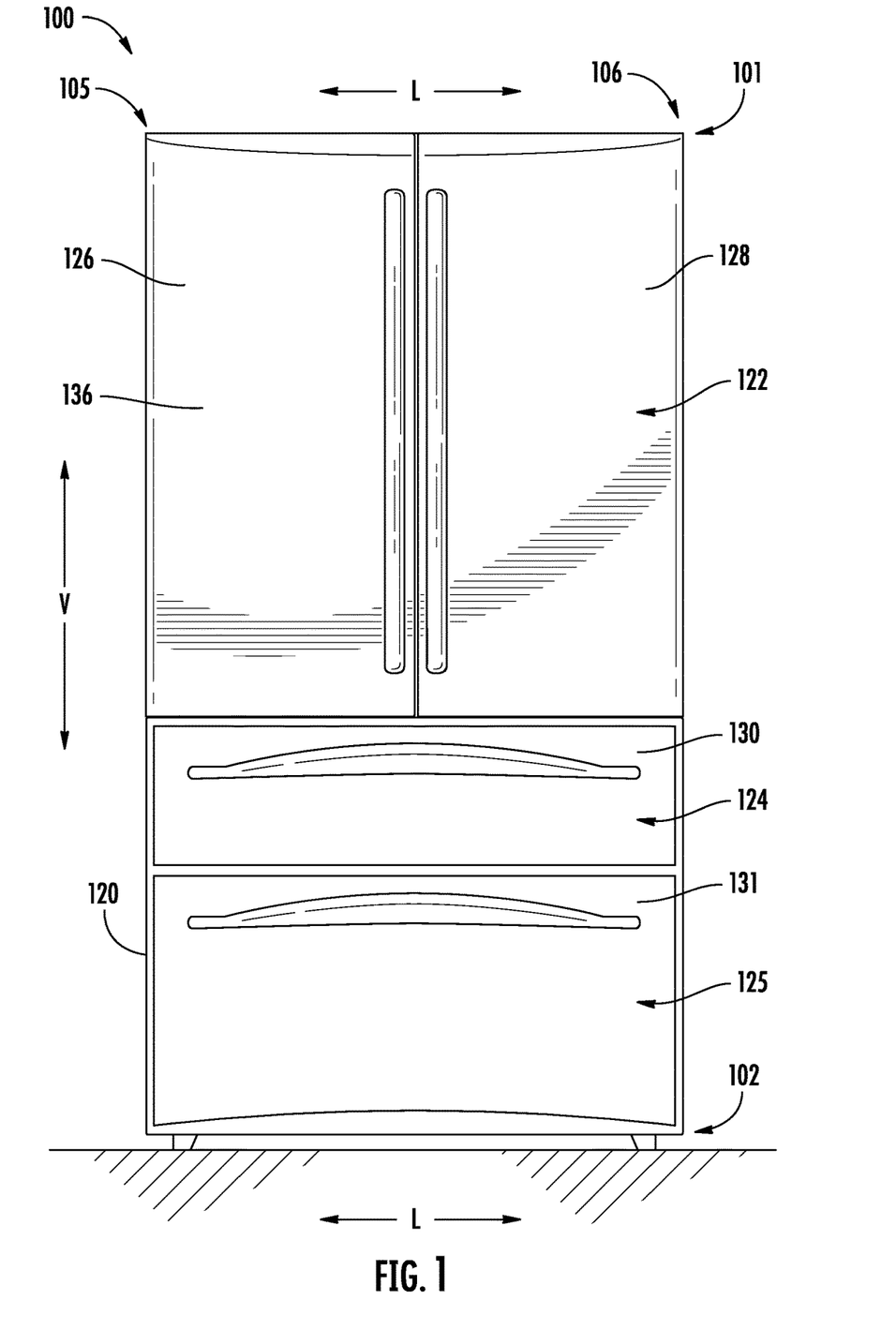
FIG. 1 provides a front view of an exemplary refrigerator appliance that may beneficially include a water pitcher in accordance with the present disclosure.

Turning to the figures, FIG. 1 provides a front view of an exemplary refrigerator appliance 100 according to an exemplary embodiment of the present disclosure. Refrigerator appliance 100 extends between a top 101 and a bottom 102 along a vertical direction V, between a left side 105 and a right side 106 along a lateral direction L, and extends between a front and a back along a transverse direction T (not shown), which is a direction orthogonal to the vertical direction V and the lateral direction L. Vertical direction V, lateral direction L, and transverse direction T are mutually perpendicular and form an orthogonal direction system for the refrigerator appliance 100.

Refrigerator appliance 100 includes a housing or cabinet 120 defining a chilled chamber, fresh food chamber 122, and one or more freezer chambers, such as a first freezer chamber 124 and a second freezer chamber 125, which may both be arranged below fresh food chamber 122 along the vertical direction V. As illustrated, fresh food chamber 122 is bounded by vertical walls at the left side 105 and at the right side 106, such walls spaced apart in the lateral direction, a horizontal wall at the top 101 and at the bottom by a lower wall 132. In this configuration, refrigerator appliance 100 may generally be referred to as a bottom mount, or bottom freezer, refrigerator. Cabinet 120 also defines a mechanical compartment (not shown) for receipt of a sealed cooling system (not shown).

Figure 2:
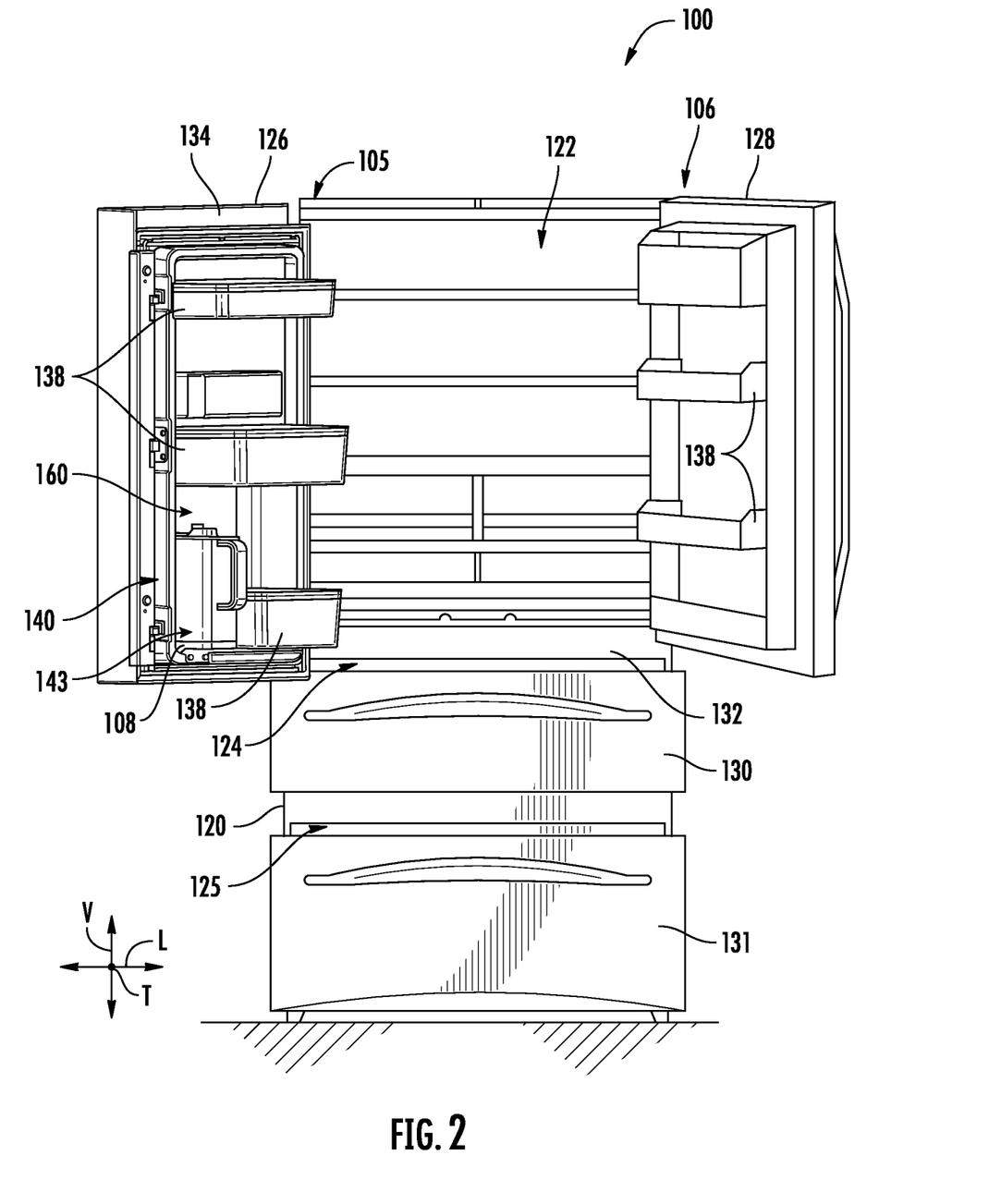
FIG. 2 provides a front view of the refrigerator appliance of FIG. 1 with the fresh food chamber doors open.

Left and right refrigerator doors 126, 128, respectively, are rotatably hinged to an edge of cabinet 120 at left 105 and right 106 sides, respectively, for accessing fresh food chamber 122 (FIG. 2) or sealing fresh food chamber 122 as illustrated in FIG. 1. For example, upper and lower hinges may couple each door 126, 128 to cabinet 120. When left and right doors 126, 128 are configured as illustrated in FIGS. 1 and 2, the door arrangement is sometimes referred to as a "French door" configuration. In other embodiments, one door may be used, rotatably hinged to one edge of cabinet 120 at one side (i.e., 105 or 106) for selectively opening or sealing fresh food chamber 122. Freezer doors, such as a first freezer door 130 and a second freezer door 131, may be arranged below refrigerator doors 126, 128 for accessing one or more freezer chambers, such as first and second freezer chambers 124, 125, respectively. In the exemplary embodiment shown in FIG. 1, freezer doors 130, 131 are coupled to freezer drawers (not shown) slidably coupled within first and second freezer chambers 124, 125. Such drawers are thus generally "pull-out" drawers in that they can be manually moved into and out of freezer chambers 124, 125 on suitable slide mechanisms. Each door 126, 128, 130, 131 can include a handle for accessing one of the chambers 122, 124, 125 of refrigerator appliance 100.

FIG. 2 provides a front perspective view of refrigerator appliance 100 showing refrigerator doors 126, 128 in an open position to reveal the interior of fresh food chamber 122. Additionally, freezer doors 130, 131 are shown in partially open positions to reveal a portion of the interior of freezer chambers 124, 125, respectively.

Left door 126 of refrigerator appliance 100 includes an inner surface 134 and an outer surface 136 (FIG. 1). Inner surface 134 generally defines a portion of the interior of fresh food chamber 122 when door 126 is in a closed position as shown in FIG. 1. Outer surface 136 is generally opposite inner surface 134 and defines a portion of the exterior of refrigerator appliance 100 when door 126 is in the closed position. The same construction may result in a similarly formed right door 128 as left door 126 with inner surface 134 and outer surface 136. Moreover, it will further be appreciated that freezer doors 130, 131 can likewise include inner and outer surfaces 134 and 136.

Doors 126, 128 may include storage bins or shelves 138 movably or fixedly attached to the inner surface 134 of the doors 126, 128. In the embodiment illustrated in FIG. 2, left door 126 includes an autofill pitcher system 140 in accordance with this disclosure. The autofill pitcher system 140 is illustrated a component of, or mounted to, the left door 126 for convenience. In other embodiments, the autofill pitcher system 140 may be mounted in a different position on the left door 126, or on the right door 128, or may be mounted elsewhere within the fresh food chamber 122. Autofill pitcher system 140 may be enclosed within the fresh food chamber when at least one of the doors 126, 128 is in the closed position of FIG. 1. In embodiments in which the autofill pitcher system 140 is on one of the doors (126 as illustrated or 128), when the door is closed (FIG. 1) the door 126 or 128 and the autofill pitcher system 140 cooperate to seal the chamber 122 with the autofill pitcher system 140 enclosed therein. In embodiments in which the autofill pitcher system 140 is within the fresh food chamber 122, the closed doors 126, 128 enclose the autofill pitcher system 140 inside the chamber as well.

The autofill pitcher system 140 comprises a removable pitcher assembly comprising pitcher 142 supported by shelf 108, a dispenser 141, and may include a controller, sensors, valves, conduit or tubing to facilitate autofilling of pitcher 142 when it is in the autofill pitcher system 140.

Figure 3:
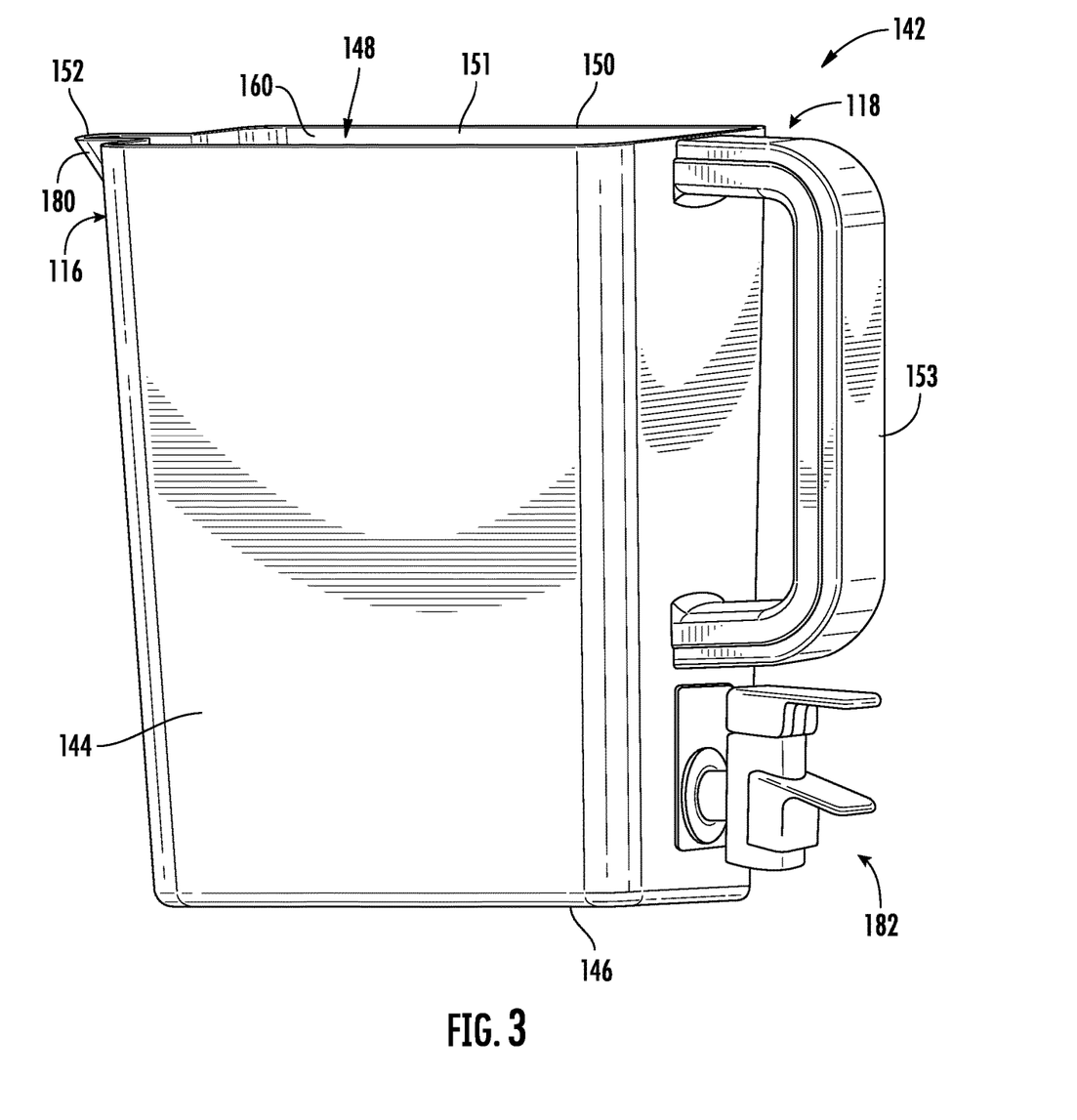
FIG. 3 provides a perspective view of an exemplary water pitcher in accordance with an embodiment of the present disclosure.

The details of exemplary pitcher 142 and pitcher assembly 143 may best be illustrated with reference to FIGS. 3 through 7. FIG. 3 is a perspective view of a representative pitcher 142 comprising a pitcher wall 144 connected to, or formed with, pitcher bottom 146. A top edge 150 is formed by the pitcher wall 144 at the pitcher end opposite pitcher bottom 146. The pitcher wall 144 and pitcher bottom 146 define a pitcher volume 148, accessible through opening 151 defined by the top edge 150. For convenience, top edge 150 may also define a spout 152, separate from the pitcher volume 148, at a first end 116 of the pitcher to facilitate directing liquid into, or out of, the pitcher 142. Spout 152 comprises incline wall 176, first side wall 178 (FIGS. 4 and 5), and second side wall 180 (FIG. 3). Incline wall 176, first and second side walls 178, 180 may be formed with pitcher wall 144 or may be formed separately and attached thereto. At a second end 118 of the pitcher, opposite the spout 152, a handle 153 may be disposed or formed on pitcher wall 144 to provide a gripping area to aid in manipulating the pitcher 142. Pitcher 142 may include a tap or spigot 182 disposed on a portion of the pitcher wall 144 and in fluid communication with volume 148. As illustrated, spigot 182 may be beneath the handle 153 and may be provided to dispense a liquid, typically chilled water, from the pitcher volume 148. In other embodiments, the spigot 182 may be located or disposed on other portions of the pitcher wall 144 or may not be a feature of the pitcher 142.

Exemplary pitcher 142 is illustrated as a generally hollow rectangular cuboid for ease of illustration only. Other embodiments may have other shapes, for example a hollow cylinder, and may or may not have features such as a handle.

Figure 4:
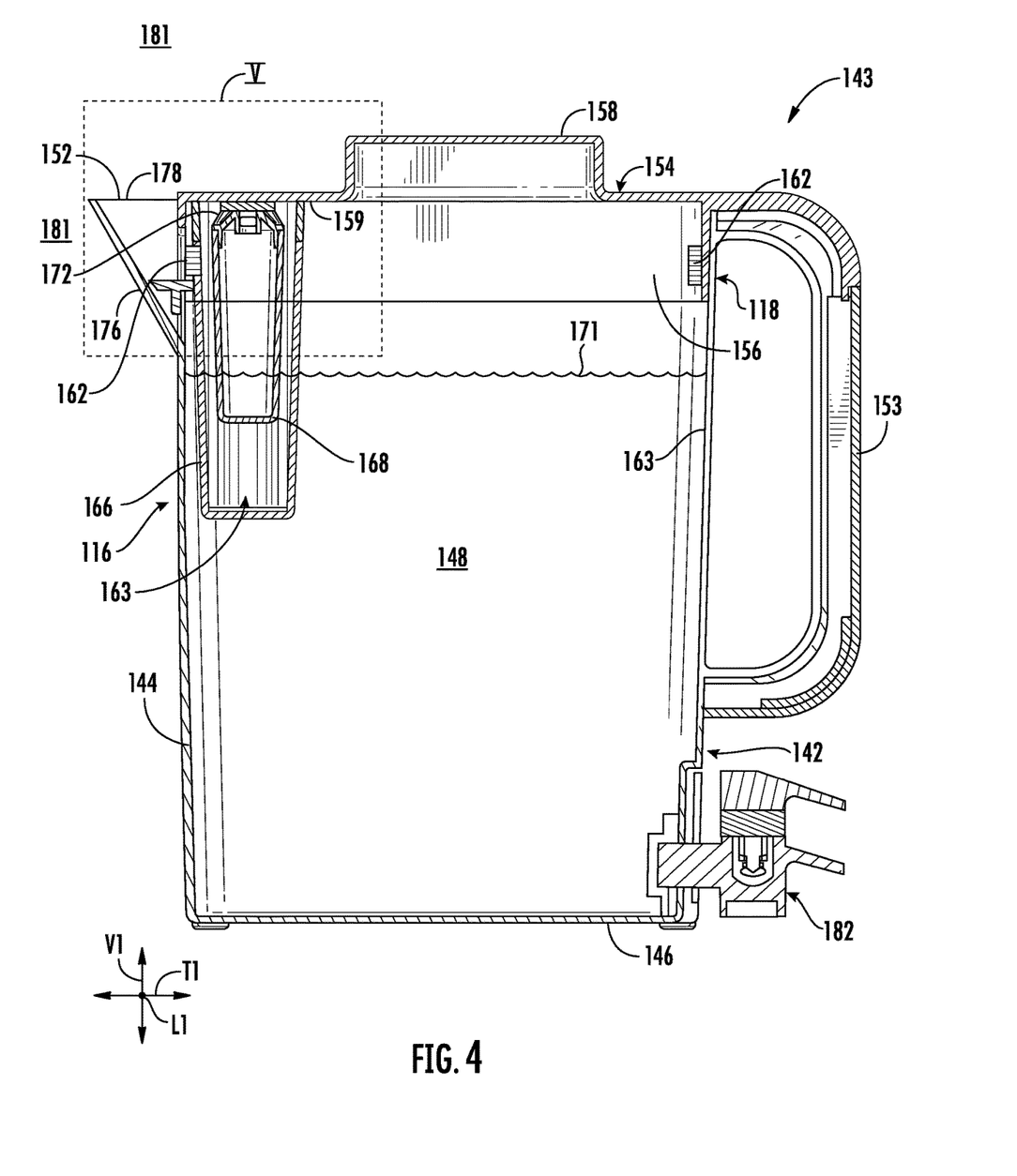
FIG. 4 provides a side cross-sectional view of an exemplary water pitcher assembly in accordance with an embodiment of the present disclosure.

An orthogonal coordinate system for an embodiment of pitcher 142 and pitcher assembly 143 is defined in FIG. 4. The vertical direction V1 is generally parallel to the vertical direction V used in reference to the refrigerator appliance 100 in FIGS. 1 and 2. Transverse direction T1 extends perpendicular to the vertical direction V1 from the spout end (first end 116) to the handle end (second end 118) of the pitcher 142. Lateral direction L1 is perpendicular to the V1-T1 plane.

As illustrated in FIG. 4, embodiments of pitcher assembly 143 may include a lid 154 removably received in the opening 151 at the top edge 150. The lid 154 may include a peripheral skirt 156 configured to be removably received in the opening 151 of pitcher 142. The skirt 156 extends from bottom surface 159 of the top wall 158, the skirt being spaced from the perimeter 161 (FIG. 6) of the lid 154. The skirt 156 is configured to be removably received in the opening 151 of pitcher 142. The top wall 158 extends beyond the skirt 156 in the L1-T1 plane. The extension of top wall 158 may facilitate an abutting relationship between the bottom surface 159 of lid 154 with top edge 150 of the pitcher 142 when the lid 154 is removably received in the pitcher 142. The abutting relationship may sealingly engage the bottom surface 159 with top edge 150. Some embodiments of the skirt 156 may include features (not shown) that engage an inner portion of pitcher wall 144 at the top edge 150 to secure the lid against accidental separation from the pitcher 142.

As illustrated, a sealing element or gasket 162 is disposed around the perimeter 157 of skirt 156 to provide a sealing engagement with the skirt 156 and the inner surface 160 (FIG. 3) of the pitcher wall 144. The gasket 162 may be formed from any material suitable to seal, or substantially seal, against infiltration of liquid, for example a polymeric material. Gasket 162 is positioned on, and extends outwardly from, the skirt 156. Gasket 162 may be vertically constrained between upper and lower retaining walls 164, 165 (FIG. 7) positioned, respectively, above and below the gasket 162 in the V1 direction. In embodiments, the gasket 162 is a separate element disposed on the skirt 156 and may be anchored to the skirt 156 using known adhesive or mechanical methods.

As illustrated, for example in FIGS. 4-7, lid 154 includes a float body 168 disposed inside a float cage 166, the float cage 166 extending vertically downward (i.e., in the V1 direction) from the bottom surface 159 proximate to the first end 116 of the pitcher assembly 143 adjacent to the spout 152. The float body 168 may be configured to rise and fall with the fluid level 171 of the fluid contained within the pitcher volume 148. The float body 168 may cooperate with an autofill pitcher system 140 (FIG. 2) to communicate a fluid level 171 to the system 140. For example, as illustrated in exemplary FIG. 4, float body 168 is in a vertically (in the V1 direction) raised position such that an upper or first end 172 of the float body 168 is proximate to the bottom surface 159 of the lid 154.

Float cage 166 extends from the bottom surface 159 of the lid 154 configured to restrain float body 168 for vertical (in the V1 direction) movement in response to the fluid level 171. In the illustrated embodiments, float cage 166 and float body 168 are generally rectangular in cross section (in the L1-T1 plane) and sized such that float body 168 may freely travel vertically with the fluid level 171 (i.e., buoyed with the fluid in pitcher volume 148). In other embodiments, float cage 166 and float body 168 may have other cross-sectional shapes. As shown for example in FIGS. 6 and 7, float cage 166 has passages 170 to allow the free flow of liquid from the pitcher volume 148 into the interior of the float cage 163 to interact with float body 168.

Figure 6:
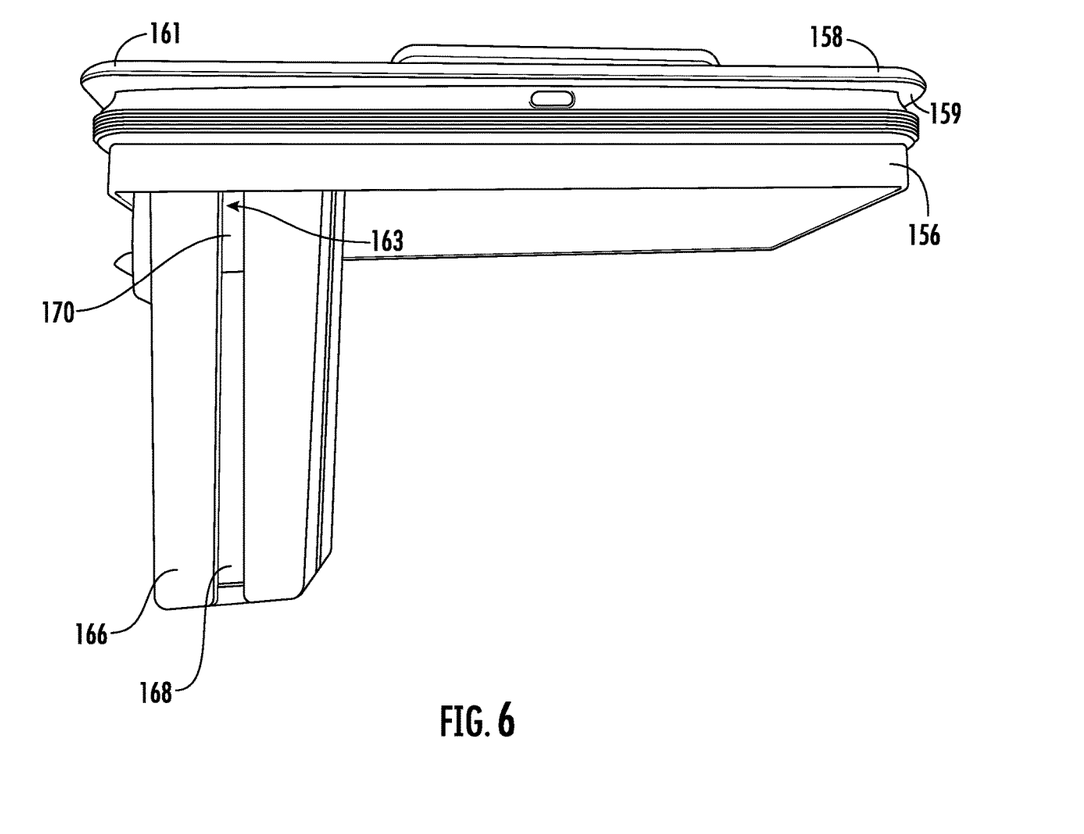
FIG. 6 is a side perspective view of a lid in accordance with an embodiment of the present disclosure.
Figure 7:
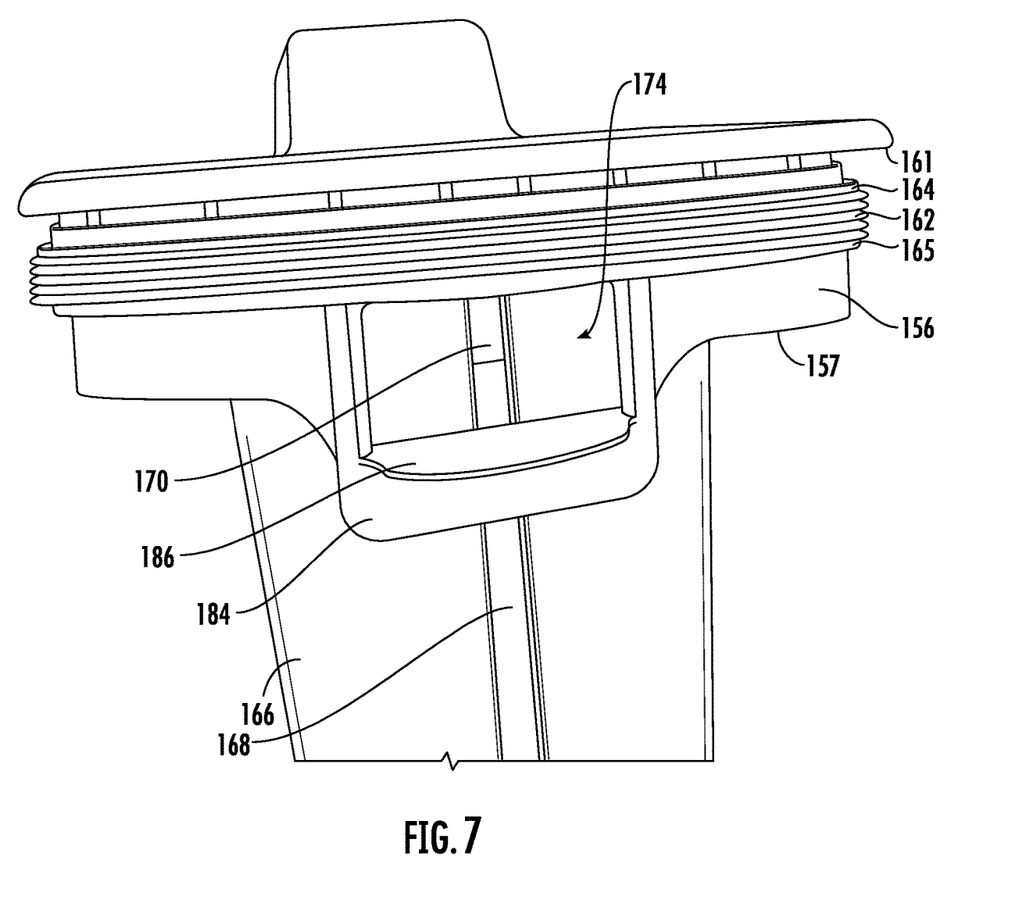
FIG. 7 provides a front perspective view of a lid in accordance with the present disclosure.

The configuration of the skirt 156 illustrated in FIG. 6 is typical of the skirt 156 in general. The skirt 156 extends as a wall downwardly from the bottom surface 159 of the top wall 158 and forms a skirt perimeter 157 inwardly offset form the perimeter 161 of the lid 154. As may be best illustrated in FIG. 7, the configuration of skirt 156 may change in the area that is adjacent to the spout 152, that is in the area between the float cage 166 and the lid perimeter 161 adjacent to the spout 152. In this area, skirt 156 may be modified with central passage 174 providing access to an interior 163 of the float cage 166. The central passage 174 may be sized to cooperate with spout 152 to allow passage of water from the pitcher volume 148 to the spout 152 when the pitcher assembly 143 is tilted forward, as by lifting handle 153 to rotate the pitcher assembly 143 about an axis generally parallel to the lateral L1 axis through the pitcher volume 148.

Figure 5:
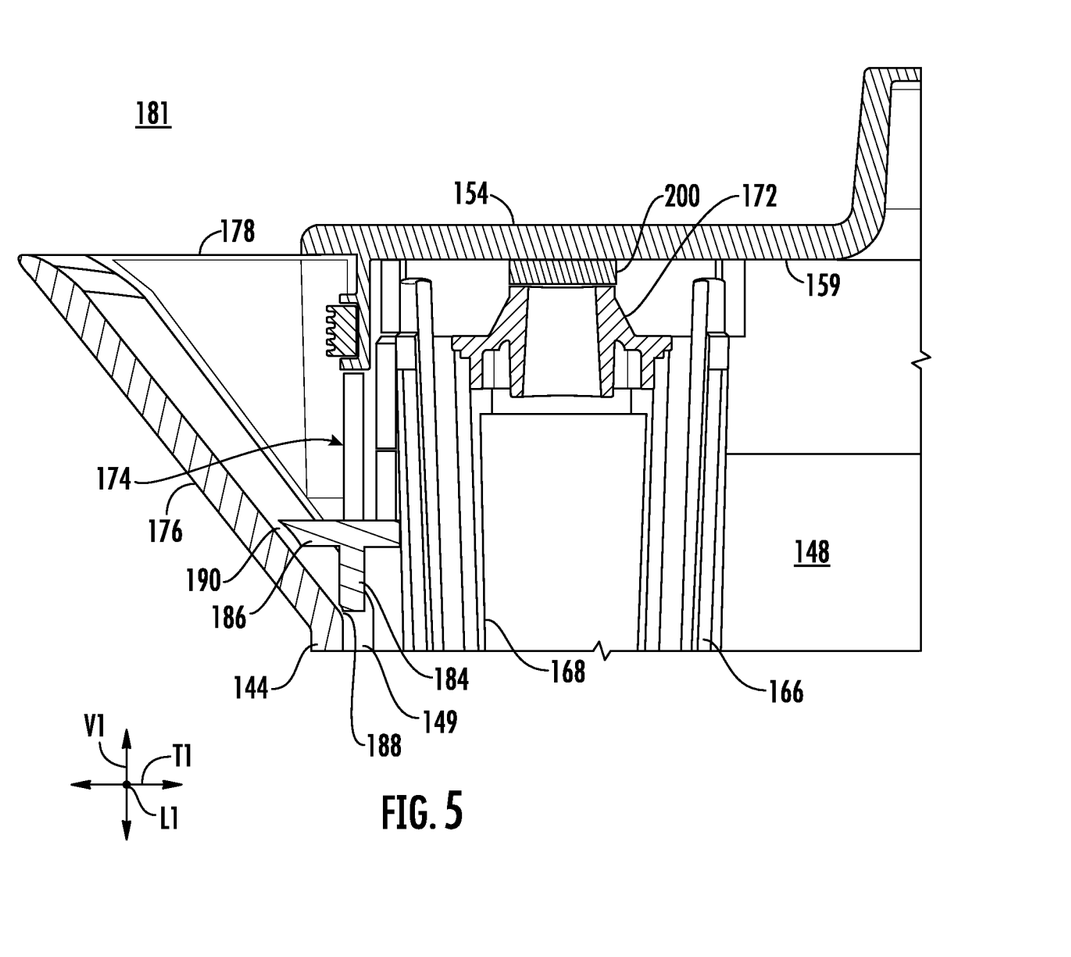
FIG. 5 provides an enlarged close-up view of the region identified as V in FIG. 4.

FIG. 5 is an enlarged view of the portion of pitcher assembly 143 indicated by V in FIG. 4 illustrating details of the spout area according to an embodiment of the present disclosure. As illustrated, a first wall 184 is disposed vertically (in the V1 direction) below the skirt 156 at the spout 152. In the exemplary illustration of FIG. 5, first wall 184 is generally coplanar with the skirt 156, that is, the first wall 184 is generally parallel to the V1 direction. Further, the first wall 184 spans the lower (i.e., in the V1 direction) lateral (L1) dimension of the central passage 174. In general, the first wall 184 and second wall 186 form the lower (in the V1 direction) boundary of central passage 174.

As illustrated at least in FIG. 5, first wall 184 extends downward in the V1 direction and terminates adjacent to, but spaced apart from, incline wall 176 of spout 152. The first wall 184 and the incline wall 176 cooperate to define first passage 188 between the pitcher volume 148 and the spout 152. In particular, passage 188 provides fluid communication between the spout 152 and the portion 149 of the pitcher volume 148 between the float cage 166 and pitcher wall 144. The first passage 188 may be provided to limit or choke the flow of liquid from portion 149 into the spout 152.

Second wall 186 extends from the first wall 184 into the spout 152 generally between the first and second spout side walls 178, 180. The second wall extends in the transverse direction (T1) and terminates adjacent to, but spaced apart from, incline wall 176 of spout 152. The second wall 186 and the incline wall 176 cooperate to define second passage 190 defined by the second wall 186, the incline wall 176 and the first and second spout side walls 178, 180. Second passage 190 may be provided to further limit or choke the flow of liquid from portion 149 of the pitcher volume 148 into the spout 152. In the exemplary embodiment illustrated in FIG. 5, second wall 186 is shown generally perpendicular to the first wall 184. In other embodiments, different angular orientations of first and second walls 184, 186 may be used.

As illustrated in FIG. 5, a portion of second wall 186 extends in the transverse direction (T1) in a direction away from the spout 152 and directed towards float cage 166. This portion of the second wall may terminate at, or adjacent to, float cage 166, and may block or choke the flow of a liquid from portion 149 of pitcher volume 148 into central passage 174.

Generally, first and second walls 184, 186 limit or block the flow of liquid from pitcher volume 148 from flowing into portion 149 (of pitcher volume 148) and into the spout 152. This configuration of the pitcher assembly 143 may beneficially prevent liquid from splashing out of the pitcher volume 148, for example when a transversely (T1) moving wave forms in the pitcher volume 148. A transverse wave may form when the pitcher assembly, containing a volume of liquid, is moved or abruptly stopped, causing a surge of liquid within the pitcher volume.

As disclosed above, float body 168 is disposed in float cage 166, free to rise and fall with the movement of the fluid level 171. In some instances, movement of the pitcher assembly 143 contribute to movement of the contents, for example a volume of water, in the form of a transverse T1 wave within the pitcher volume 148. As the wave peak or crest reaches the first end 116 of the pitcher assembly 143, the float body 168 rises with the advancing flow. In some cases, the movement of the water in the upward (V1 direction) may be rapid. The float body will also rapidly rise with the crest of the wave and may impact the bottom surface 159 of the lid 154. The impact may generate an unpleasant noise and over time may damage the float body 168 or the bottom surface 159 of the lid 154.

As illustrated in FIG. 5, embodiments of the present disclosure include an energy absorbing material 200 positioned between the first end 172 of the float body 168 and the bottom surface 159 of the lid 154. In some embodiments, the energy absorbing material 200 is affixed to float body 168 at the first end 172. In other embodiments, the energy absorbing material 200 is affixed to a portion of the bottom surface 159 of the lid 154. Energy absorbing material 200 may absorb energy in the vertical (V1) direction, for example when deflected or compressed in at least the vertical direction. In some embodiments, the energy absorbing material may be any suitable material to absorb energy, for example sound energy, when compressed or deflected. The energy absorbing material 200 may include compositions comprising elastomers, natural rubber materials, or synthetic rubber materials.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A pitcher assembly defining a vertical direction, a lateral direction, and a transverse direction, the vertical, lateral, and transverse directions being mutually perpendicular, the pitcher assembly comprising:
   a pitcher including a pitcher wall connected to a pitcher bottom defining a pitcher volume, the pitcher wall defining an opening at a top edge of the pitcher, and a spout defined by a first spout wall, a second spout wall, and an incline wall;
   a lid removably received in the opening of the pitcher, the lid comprising:
      a top wall having a bottom surface;
      a skirt extending from the bottom surface;
      a first wall disposed vertically below the skirt at the spout; and
      a second wall extending from the first wall into the spout; and
   wherein a flow path is defined by the first wall, the second wall, and the spout.

2. The pitcher assembly of claim 1, wherein the first wall and second wall impede a flow of contents from the pitcher volume to the spout when the vertical direction of the pitcher assembly is in a generally vertical orientation.

3. The pitcher assembly of claim 1, wherein the first wall and the second wall are received in a portion of the spout between the first spout wall, the second spout wall, and the incline wall.

4. The pitcher assembly of claim 3, wherein the first wall and the second wall are spaced apart from the first spout wall, the second spout wall, and the incline wall.

5. The pitcher assembly of claim 4, wherein the first wall and the incline wall cooperate to form a first passage.

6. The pitcher assembly of claim 4, wherein the second wall, the first spout side wall, the second spout side wall, and the incline wall cooperate to form a second passage.

7. The pitcher assembly of claim 1, further comprising a float cage extending vertically downward from the bottom surface of the top wall proximate to a first end of the pitcher wherein the first wall is positioned between the float cage and the pitcher wall.

8. The pitcher assembly of claim 7, wherein the float cage defines a plurality of openings, and an interior of the float cage is in fluid communication with the pitcher volume through the plurality of openings.

9. The pitcher assembly of claim 8, wherein the pitcher wall, the first wall, the second wall, the float cage, and the spout cooperate to provide a first flow path from the pitcher volume to an exterior environment.

10. The pitcher assembly of claim 8, wherein the skirt defines a central passage, the central passage cooperating with the spout and the float cage to provide a second flow path from the pitcher volume to an external environment.

11. The pitcher assembly of claim 1, wherein the first wall is spaced apart from the pitcher wall.

12. The pitcher assembly of claim 1, wherein the first wall is generally coplanar with the skirt.

13. The pitcher assembly of claim 1, wherein the first wall is generally parallel to the second wall.

14. The pitcher assembly of claim 1, further comprising:
a float body constrained for displacement in the vertical direction between a first position where a first end of the float body is proximate to the bottom surface of the lid and a second position where the first end is distal from the bottom surface of the lid; and
an energy-absorbing material positioned vertically between the first end of the float body and the lid.

15. The pitcher assembly of claim 1, wherein the second wall further extends into the pitcher volume in the lateral direction.

16. A pitcher assembly defining a vertical direction, a horizontal direction, and a lateral direction, the vertical, horizontal, and lateral directions being mutually perpendicular, the pitcher assembly comprising:
a pitcher including a pitcher wall connected to a pitcher bottom defining a volume, the pitcher wall defining an opening at a top edge of the pitcher;
a lid removably fitted to the opening of the pitcher, the lid comprising a float body constrained for displacement in the vertical direction between a first position where a first end of the float body is proximate to an inner surface of the lid and a second position where the first end is distal from the inner surface of the lid; wherein the pitcher assembly includes an energy-absorbing material positioned vertically between the first end of the float body and the lid.

17. The pitcher assembly of claim 16, wherein the energy-absorbing material is affixed to the inner surface of the lid.

18. The pitcher assembly of claim 16, wherein the energy-absorbing material is affixed to the first end of the float body.

19. The pitcher assembly of claim 16, wherein the energy absorbing material absorbs energy when compressed in a vertical direction.

20. The pitcher assembly of claim 16, wherein the energy absorbing material comprises an elastomer.

* * * * *